July 4, 1967      K. K. TANAKA      3,329,323
OVERHEAD CARRIER FOR USE WITH TWO-WHEELED VEHICLE
Filed Oct. 15, 1965
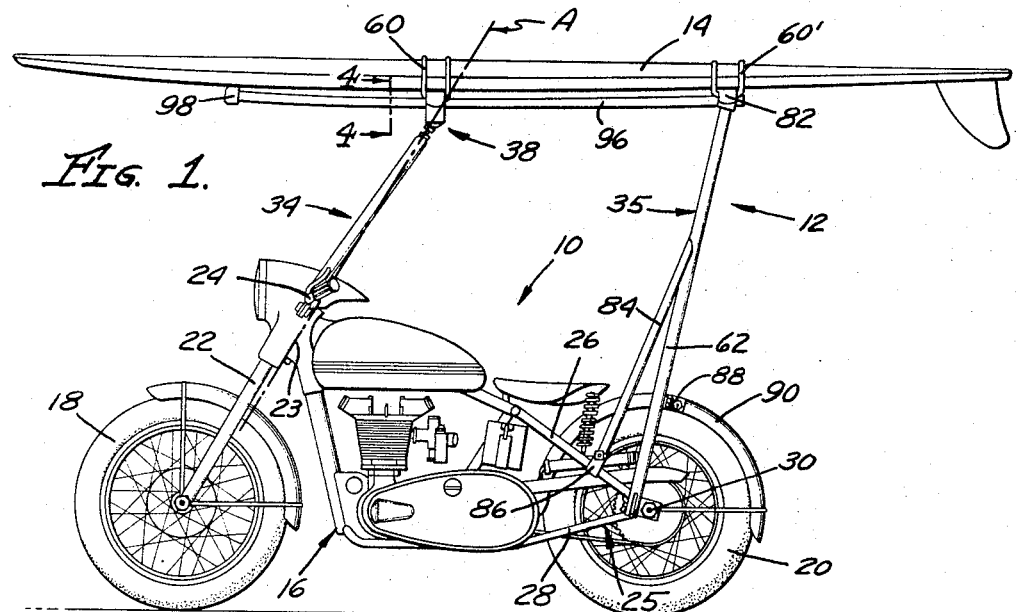
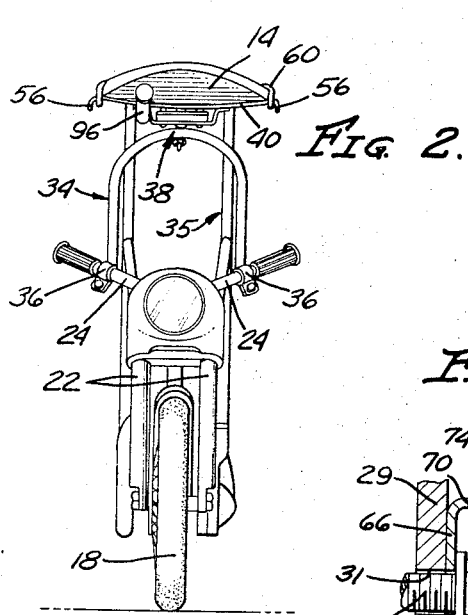
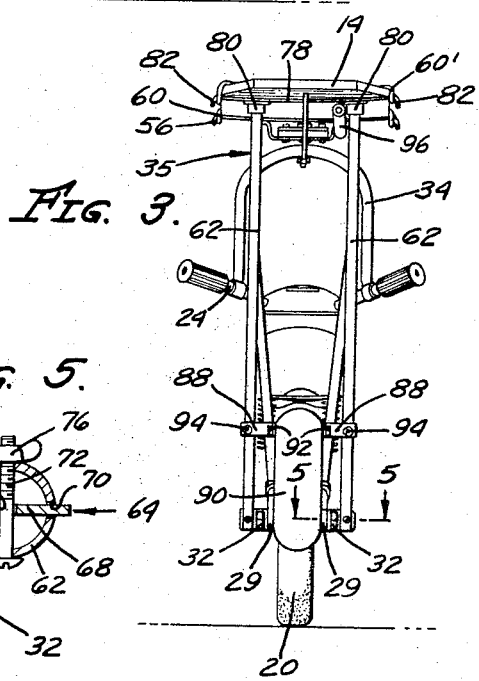
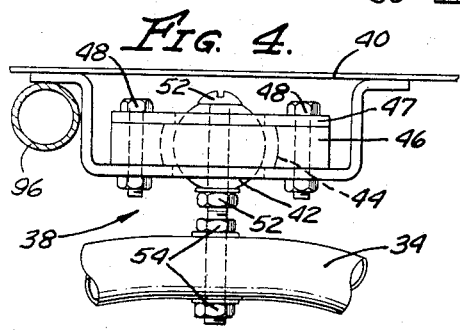
INVENTOR
KENNETH K. TANAKA
BY Herbert E. Kidder
AGENT ID=United States Patent Office 3,329,323
Patented July 4, 1967

3,329,323
OVERHEAD CARRIER FOR USE WITH TWO-WHEELED VEHICLE
Kenneth K. Tanaka, 6788 Rainier Court,
Riverside, Calif. 92506
Filed Oct. 15, 1965, Ser. No. 496,603
3 Claims. (Cl. 224—41)

The present invention relates to an overhead carrier for use with two-wheeled vehicles, such as bicycles, motor scooters, or motorcycles, and the invention is more particularly concerned with an overhead carrier for elongated loads, such as surfboards. While the invention is particularly adapted for use as a surfboard carrier and is herein illustrated and described as such, it can also be used to carry camping equipment and the like.

The sport of surfboarding has become tremendously popular in the last few years, and large numbers of young "surfers" living within 50 miles or so of the seacoast have acquired boards, which they take to the beach at every possible opportunity. Some of these are too young to have automobiles of their own, but do have bicycles or scooters. Others have scooters or motorcycles in preference to cars. For all of those surfers who do not own or have the use of an automobile, the transport of their surfboards to the beach is a major problem. The average surfboard is about 8 feet long by about 2 feet wide, and weighs about 30 pounds. It is therefore an awkward load to carry, even in an automobile, and virtually impossible to handle on any other kind of vehicle.

The primary object of the present invention is to provide an overhead carrier for surfboards, which makes it possible to carry the same on a bicycle, scooter, or motorcycle. Thus, any young surfer who does not have the use of a car, but does have a bicycle, scooter, or motorcycle, can transport his surfboard to the beach with the greatest of ease.

Another important object of the invention is to provide an overhead carrier for use with two-wheeled vehicles, which can be quickly and easily mounted on the vehicle or dismounted therefrom, and which requires no structural changes or modifications in the vehicle other than drilling a couple of bolt holes in the rear fender (or fender braces) for attachment of bracing members thereto.

A further object of the invention is to provide an overhead carrier for two-wheeled vehicles, which has no appreciable adverse effect on the handling of the vehicle under ordinary driving conditions and at normal driving speeds.

Another object of the invention is to provide a carrier of the class described which is simple and inexpensive to manufacture, easy to install, and adapted for use on any bicycle, scooter, or motorcycle.

Still another object of the invention is to provide an overhead carrier for use with a two-wheeled vehicle, which can be used to transport camping equipment or other bulky and awkward loads, particularly loads that can be packed into an elongated package having somewhat the same general configuration as a surfboard.

These and other objects and advantages of the present invention will become apparent to those skilled in the art upon consideration of the following detailed description of the preferred embodiment thereof, reference being had to the accompanying drawings, wherein:

FIGURE 1 is a side elevation of a motorcycle having a carrier mounted thereon, embodying the principles of the invention;

FIGURE 2 is a front elevational view of the same;

FIGURE 3 is a rear view;

FIGURE 4 is an enlarged fragmentary sectional view, taken at 4—4 in FIGURE 1; and FIGURE 5 is an enlarged fragmentary sectional view taken at 5—5 in FIGURE 3.

In the drawings, the reference numeral 10 designates a motorcycle, upon which is mounted the carrier 12 of the present invention, supporting a surfboard 14. The motorcycle 10 includes a frame 16, made of welded steel tubing and supported on front and rear wheels 18 and 20, respectively. The front wheel 18 is rotatably supported on a front fork 22, which is pivotally connected at 23 to the frame 16 for turning about a downwardly and forwardly inclined axis A. Connected to the front fork 22 and turnable therewith are laterally projecting handlebars 24, having the usual handlegrips at their outer ends.

The rear wheel 20 is rotatably supported by a rear fork 25, consisting of rearwardly converging upper and lower fork members 26 and 28, which are joined at their rear ends to a common plate 29. The axle 30 passes through holes 31 in the plate 29, and is secured by nuts 32, which are screwed onto the threaded ends of the axle.

The carrier 12 comprises a front support 34 and rear support 35. The front support 34 is preferably made of steel or aluminum tubing bent into the configuration of an inverted U, and having clamps 36 at the ends thereof, which are adapted to be clamped onto the handlebars 24 of the motorcycle. The front support 34 is connected by a swivel connection 38 to a transverse, load-supporting member 40, upon which the surfboard 14 rests. It will be noted in FIG. 1 that the front support 34 extends upwardly and rearwardly from the handlebars 24 in an inclined plane substantially parallel to the inclined turning axis A, and that the swivel connection 38 lies directly on the axis A.

The swivel connection 38 is preferably a ball-and-socket joint, consisting of a ball 42 and socket 44, which are retained within an aperture in a mounting block 46. The mounting block 46 is capped by a plate 47, which retains the socket 44 in the said aperture, and the assembly comprising the block 46, plate 47, ball 42, and socket 44 is secured by bolts 48 to a transversely disposed, generally U-shaped bracket 49, which is mounted on the underside of member 40.

The uppermost and lowermost portions of the ball 42 project through openings in the plate 47 and bracket 49, respectively, and passing down through a hole in the ball 42 is a screw 50. A nut 52 is threaded onto the screw 50, and is drawn up tight against the underside of the ball 42. The lower end of the screw 50 projects down through a hole in the center of the U-shaped, tubular front support 34, and is secured thereto by two nuts 54, which are drawn up tight against opposite sides of the tube.

The outer ends of the load-supporting member 40 are bent downwardly at 56 to provide hooks for the ends of a loop 60 of elastic shock cord, which is passed up over the top of the surfboard. The shock cord is stretched tight when passed over the surfboard and hooked under the downturned ends 56 of the member 40, as shown in the drawings, and this holds the surfboard snugly down against the member 40.

The rear support 35 comprises a pair of laterally spaced, generally vertical posts 62, the bottom ends of which pass on opposite sides of the rear wheel 20, and are secured to the frame 16 by means of a bracket 64. The bracket 64 is bent to a right angle, as shown in FIG. 5, and one flange 66 thereof is apertured to pass the axle 30. The axle nut 32 is drawn up tight against a washer on the outside of flange 66, thereby clamping the bracket 64 solidly to the rear fork plate 29. The other flange 68 of the bracket 64 extends laterally out from the plate 29, and is straddled by the bottom end of the post 62. For this purpose, the post 62 has a transverse slot 70 cut into its bottom end, which receives the flange 68. The bottom end of the post 62 is drilled diametrically to receive a bolt 72, which also passes through a hole 74 in the flange 68. The threaded end of the bolt 72 projects beyond the surface of the post 62, and screwed onto it is a wing nut 76.

The top ends of the posts 62 are connected to the underside of a second transverse load-supporting member 78 at laterally spaced points thereon by fittings 80. The member 78 provides a wide, flat support for the rear end of the surfboard 14 and, like the front member 40, has downturned ends 82 which engage and hold the ends of a second shock cord 60'. The laterally spaced posts 62 not only carry the weight of the rear end of the surfboard 14, but also cooperate with front support 34 to provide three points of support therefor, so that the surfboard is supported against tilting laterally.

The rear support 35 is braced against fore-and-aft swinging movement about the rear axle shaft 30 by means of two inclined braces 84, the upper ends of which are attached to the forward sides of the posts 62 slightly above the midpoints thereof. The braces 84 extend downwardly and forwardly from their points of attachment to the posts 62, and at their bottom ends have clamps 86, which clamp onto the upper fork members 26.

The rear support 35 is also braced against lateral swaying by means of braces 88 on each side of the rear fender 90. The braces 90 may conveniently be in the form of angle brackets, each of which has one leg that is secured by a bolt 92 to the side of the fender, and the other leg of which is attached by a bolt 94 to the adjacent post 62. In the case of those two-wheeled vehicles having a sprung rear wheel, the sway braces 88 would be constructed with a hinge to accommodate vertical movement of the posts 62 with the rear axle, as will be clearly understood by those skilled in the art.

Preferably, the front and rear supports 34, 35 are connected together at their top ends by a fore-and-aft extending tubular member 96, the front end of which extends forwardly beyond the front support 34 and has a cushioned tip 98 at its end that bears against the underside of the surfboard 14 near the front end thereof. The tubular member 96 is connected at its rear end to the right-hand fitting 80, as shown in FIG. 3, and extends forwardly, alongside the right-hand side of the bracket 49, to which it is attached in any suitable manner. The member 96 serves both to stabilize the surfboard 14 by supporting it at a point well forward of the front support 34, and also to join the top ends of the supports 34, 35 together, so that the entire carrier 12 is, in effect one integral structure.

The carrier 12 is readily mounted on the motorcycle 10 by first setting the bifurcated bottom ends of the rear posts 62 on the brackets 64, and securing them to the brackets by the bolts 72 and wing nuts 76. The clamps 36 of the front support 34 are then clamped onto the handlebars 24, after which the clamps 86 on the bottom ends of the braces 84 are connected to their respective fork members 26, and sway braces 88 are connected to braces 84.

The surfboard is then lifted up onto the load-supporting members 40 and 78, and is secured in place by passing the shock cords 60, 60' over the top of the surfboard and hooking the ends thereof under the projecting ends of the members 40 and 78. The surfboard is now securely mounted on the carrier 12, and the motorcycle can be driven with little or no adverse effect on its driving or riding characteristics due to the load. The location of the ball-and-socket swivel connection 38 on the upward extension of the turning axis A insures that turning of the handlebars 24 will have no effect whatever on the front support of the carrier, and the surfboard remains parallel to the frame 16 at all times.

Instead of the surfboard 14, any load that can conveniently be mounted on the transverse load-supporting members 40 and 78 may be transported on the carrier 12. By way of example, the carrier 12 could be used to transport camping equipment, skis, ladders, lengths of lumber, etc., all of which are awkward loads that are virtually impossible to carry on a two-wheeled vehicle without the present carrier.

While I have shown and described what I believe to be the preferred form of my invention, it will be understood by those skilled in the art that various changes may be made in the shape and arrangement of the several parts without departing from the broad scope of the invention as defined in the following claims.

I claim:

1. An overhead carrier for use with a two-wheeled vehicle having a frame, a front wheel fork connected to said frame for turning about a downwardly and forwardly inclined axis, and handlebars connected to said front wheel fork and turnable therewith, said carrier comprising:

a front support having the general configuration of an inverted U;

clamping means on the ends of said front support engageable with said handlebars on opposite sides of said turning axis, said front support extending upwardly and rearwardly from said handlebars generally parallel to said turning axis;

a first, transversely disposed load-supporting member positioned above said first front support;

a universal connection joining said load-supporting member to the top end of said inverted U-shaped member, the center of said universal connection lying on an extension of said turning axis;

a rear support fixed to said frame adjacent the rear wheel of said vehicle and extending upwardly therefrom;

a second transverse load-supporting member fixed to the top end of said rear support; and means for securing a load to said first and second load-supporting members.

2. An overhead carrier for use with a two-wheeled vehicle, as set forth in claim 1, wherein said rear support comprises a pair of laterally spaced, vertical posts, the bottom ends of which are connected to said frame on opposite sides of the rear wheel, the top ends of said posts being connected to said second transverse load-supporting member at laterally spaced points thereon.

3. An overhead carrier for use with a two-wheeled vehicle, as set forth in claim 2, which includes bracing means connected to the upper portion of said rear support and extending downwardly and forwardly therefrom, the lower end of said bracing means being connected to said frame at a point spaced forwardly from the bottom ends of said posts;

and sway-brace means connected to said frame and attached to said rear support posts at a point spaced upwardly from the bottom ends thereof;

said bracing means bracing said rear support against fore-and-aft swaying, and said sway-brace means bracing said rear support against side-to-side swaying.

References Cited

UNITED STATES PATENTS 1,044,867  11/1912  DuBreuil _____ 224—39
1,357,239  11/1920  Krok _____ 135—7 X

FOREIGN PATENTS 709,781  5/1931  France.

GERALD M. FORLENZA, *Primary Examiner.*

MARVIN A. CHAMPION, *Examiner.*

F. E. WERNER, *Assistant Examiner.*